United States Patent
Fish et al.

(10) Patent No.: US 7,931,403 B2
(45) Date of Patent: Apr. 26, 2011

(54) POSITION SENSING COMPOSITE CYLINDER

(75) Inventors: Elson B. Fish, Lakeville, IN (US); Paul H. Lashbrook, South Bend, IN (US); Scott Farrisee, South Bend, IN (US); James Shobert, Zionsville, IN (US)

(73) Assignee: Polygon Company, Walkerton, IN (US)

( * ) Notice: Subject to any disclaimer, the term of this patent is extended or adjusted under 35 U.S.C. 154(b) by 646 days.

(21) Appl. No.: 12/032,017

(22) Filed: Feb. 15, 2008

(65) Prior Publication Data
US 2008/0173172 A1 Jul. 24, 2008

Related U.S. Application Data

(63) Continuation-in-part of application No. 11/868,363, filed on Oct. 5, 2007, which is a continuation-in-part of application No. 11/566,535, filed on Dec. 4, 2006, now Pat. No. 7,278,788, which is a continuation of application No. 10/165,237, filed on Jun. 7, 2002, now abandoned.

(60) Provisional application No. 60/890,073, filed on Feb. 15, 2007.

(51) Int. Cl.
*F16C 29/02* (2006.01)

(52) U.S. Cl. .......... 384/42; 384/8; 384/29; 92/5 R
(58) Field of Classification Search .......... 384/8, 9, 384/26, 29, 42; 92/5 R
See application file for complete search history.

(56) References Cited

U.S. PATENT DOCUMENTS

| | | |
|---|---|---|
| 3,345,732 A | 10/1967 | Brower |
| 4,234,648 A | 11/1980 | Patz et al. |
| 4,543,366 A | 9/1985 | Smith |
| 5,438,274 A * | 8/1995 | Bitar et al. .......... 92/5 R |
| 5,907,273 A | 5/1999 | Ross, Jr. et al. |
| 2002/0115360 A1 | 8/2002 | Mashiko |
| 2007/0214952 A1 * | 9/2007 | Kossmann .......... 92/5 R |
| 2008/0197948 A1 * | 8/2008 | Hedayat .......... 92/5 R |

FOREIGN PATENT DOCUMENTS
WO 03103941 12/2003

\* cited by examiner

*Primary Examiner* — Thomas R Hannon
(74) *Attorney, Agent, or Firm* — Barnes & Thornburg, LLP; Mark J. Nahnsen

(57) ABSTRACT

A fluid power composite cylinder that includes conductive and resistive material as part of the composite cylinder. The conductive and resistive material to provide a sensor feature that is used to assist position sensing electronic devices in sensing the position of a piston within the cylinder.

19 Claims, 7 Drawing Sheets

POSITION SENSING COMPOSITE CYLINDER

This application claims priority under 35 U.S.C. §119(e) to U.S. Provisional Application Ser. No. 60/890,073, filed Feb. 15, 2007, and continuation-in-part application Ser. No. 11/868,363, filed Oct. 5, 2007, which is a continuation-in-part application Ser. No. 11/566,535, now U.S. Pat. No. 7,278,788, which is a continuation of application Ser. No. 10/165,237, which are expressly incorporated by reference herein.

BACKGROUND

A fluid power composite cylinder that incorporates sensor features to assist in position sensing devices to sense the position of a piston within the cylinder that can not be achieved with conventional metallic cylinders.

SUMMARY

The present disclosure relates to a composite cylinder that incorporates within its dielectric wall a conductive material that provides resistivity, capacitance, conductance, varying magnetic fields, and other types of features required for electronic sensors incorporated in (or on) the piston, piston rod, end pieces or other components located within the cylinder. The fluid power composite cylinders incorporate implants in the form of linear transducer devices within the wall of the composite cylinder to detect the position of the piston within a cylinder. The fluid power composite cylinders incorporating electromagnetic shielding materials within the wall of the cylinder to protect against undesirable electrical interference. Such shielding prevents cross-talk between adjacent composite cylinders. Since the sensing equipment is built into the cylinder, there is a reduction in costs associated with conventional hydraulic position cylinders.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
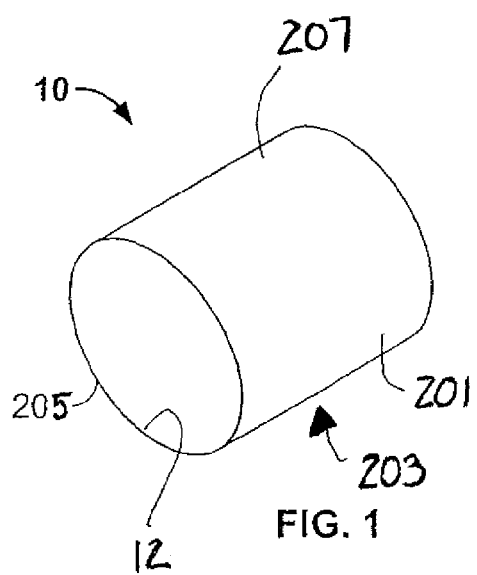
FIG. 1 is a perspective view of the position sensing composite cylinder.
Figure 2:
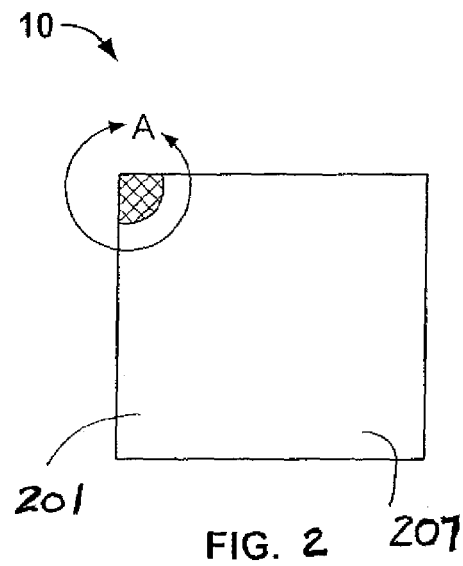
FIG. 2 is a side elevational view of the composite cylinder of FIG. 1.
Figure 3:
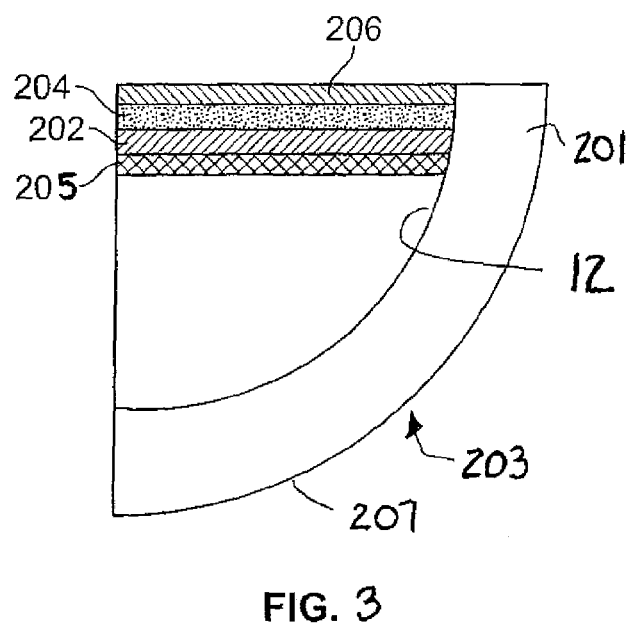
FIG. 3 is an exploded view of section A of FIG. 2 showing the different layers of the composite cylinder.
Figure 4:
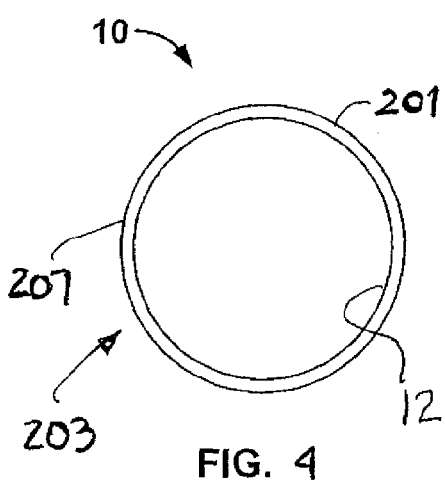
FIG. 4 is a front elevational view showing the layers of the cylinder.

The present disclosure relates to resistivity type positioning fluid power cylinders 10. More specifically, the present disclosure relates to a fluid power composite cylinder 10 such as the AeroSlide cylinder manufactured by Polygon that includes a thin cylindrical layer of a resistive (or semi-conductive) material 202 located within the wall 201 of the dielectric cylinder tube 203, as shown, for example, in FIG. 3. The location of the resistive (or semi-conductive) layer 202 in the wall 201 of the cylinder tube 203 relative to the bore surface 205 and the thickness and the resistivity of the resistive material 202 varies depending on the requirements of the electronic positioning sensor that is coupled to the cylinder 10. Examples of sensor components that can be used in connection with the cylinders 10 include but not limited to sensors requiring resistivity, sensors requiring capacitance, and sensors requiring varying magnetic field.

Cylinders 10 with the position sensing components shown in FIGS. 1-6 can be used for piston positioning sensing, piston velocity control, cycle counting in fluid power hydraulic cylinders. Use of this arrangement provides cost savings, and greater monitoring of piston and cylinder wear.

In one embodiment, a multiple of thin resistive layers 202 may be positioned at various locations within the wall 201 of the cylinder tube 203. The resistive film in this embodiment is located between dielectric layers 204 in the wall 201 of the composite cylinder 10. In another embodiment the cylinder 10 incorporates an electromagnetic shielding material 206 within the cylinder wall 201 or at the outer surface 207 of the dielectric composite tube 203 to prevent undesirable electrical interference with the positioning sensor device.

The resistive material used in the resistive layer 202 of the dielectric composite tubing 203 may be in the form of a polymeric gel coat formulated with the desirable amount of conductive filler such as carbon black to give the desired resistivity. The polymeric gel coat may be applied (but not limited to) during the manufacturing process at the desired location within the composite wall by normal gel coating techniques such a spraying or contact application, preferably between the conductive layer and the outer surface 207 of the cylinder 10.

Figure 5:
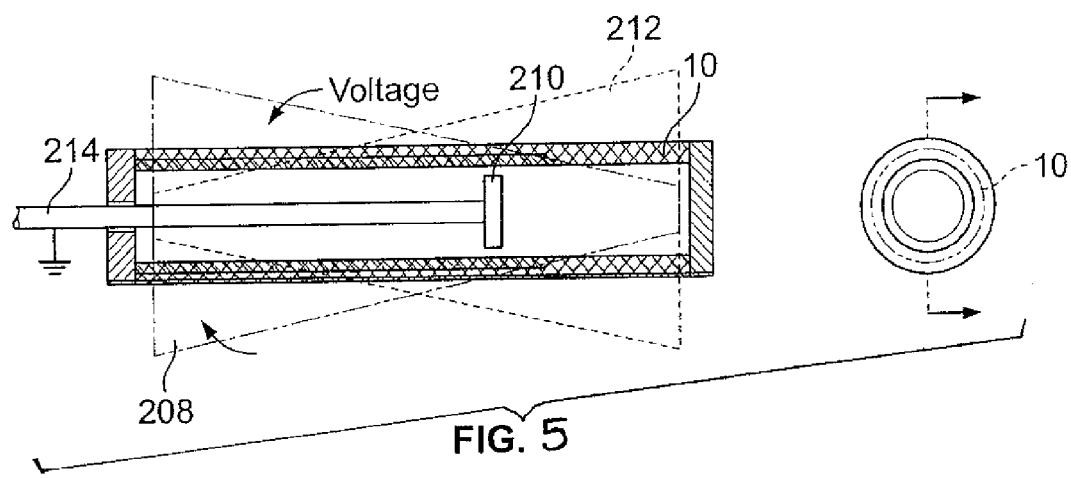
FIG. 5 is a cross-sectional view of a composite cylinder having a capacitive sensor.

In yet another embodiment, the resistive material 202 may also take the form of a resistive conductive polymeric thin film or metallic film that is wrapped onto the laminated composite cylinder 10 at a desired location within the wall 201 of the cylinder tubing 203, as suggested in FIG. 5. In yet another embodiment, the resistive material may also take the form of conductive fibers 216 such a carbon fiber that is filament wound into the cylinder wall during the filament winding process used in manufacturing the cylinder 10, as suggested in FIG. 6.

In yet another embodiment, the resistive material 202 may take the form of a conductive prepreg consisting of a dielectric reinforcing material such as fiber glass roving with a semi-conductor polymer matrix. The resistive material 202 is not limited to the above but may take other forms to meet the intent of this invention.

The present disclosure also relates to fluid power capacitive positioning sensor cylinders 10. In this embodiment, but not limited to this embodiment, an area variation type capacitor is made by integrating a conductive thin foil 212 between dielectric laminates 204 in the wall 201 of the composite cylinder tube 203, as shown, for example, in FIG. 5. The foil 212 forms a symmetric trapezoid orientated about the axis of the cylinder 10. The taper in the foil 212 relative to the axial direction of the cylinder bore 205 provides a changing exposed area to piston 210 as the piston 210 moves in the cylinder 10. Normally the piston 210 is ground while a voltage is applied to the foil 212. The moving piston 210 thereby creates a changing capacitance which is proportional to the changing capacitance area.

By tuning the capacitance at retract and extend positions of the fluid power cylinder 10 and knowing the capacitance change from retract to extend position is a linear function, the position of the piston 210 can be electronically monitored. The dielectric composite tube material 200 (located between the conductive foil 212 and the bore surface 205 and the relatively small distance between the bore surface 205 and the piston outer diameter serves as a dielectric spacer between the conductive surfaces of the capacitors.

The present disclosure also relates to fluid power electromagnetic position sensor cylinders. In this embodiment, a conductive wire 216 is wound symmetrically at a changing wind angle about the axis of the composite cylinder tube 203. The wire 216 is imbedded within the dielectric laminate of the composite tube wall 201 and preferably located near the bore surface 205 and the piston 210 within the cylinder 10 is electrically grounded. Due to the magnetic field density changing with axial movement of the piston 210, the position of the piston 210 is proportional to the change in electromagnetic field current, thereby providing a means for electronically monitoring the relative position of the piston 210.

FIG. 5 shows a capacitive sensor formed with the composite cylinder 10. The cylinder 10 includes the tapered conductive foil electrode 212 that positioned to lie around the cylinder 10. A charge is placed on the foil electrode and the metallic piston 210 and rod 214 are grounded. The tapered foil 212 provides a changing face area as the piston 210 moves axially producing a change in capacitance.

Figure 6:
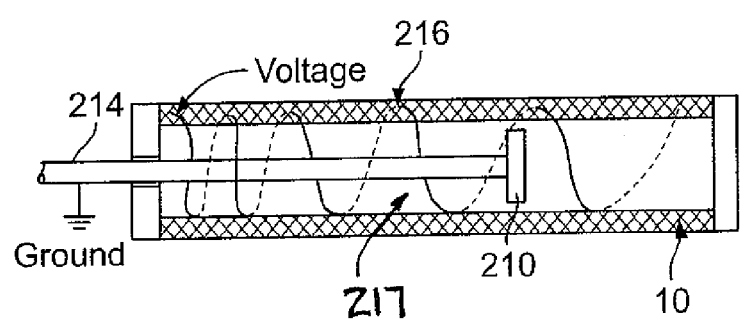
FIG. 6 is a cross-sectional view of a composite cylinder having a linear motion transducer.

FIG. 6 shows a linear motion transducer formed of a variable wound coil 217 that is wound within the dielectric composite fluid power cylinder 10 as it is being manufactured. The coil wire 216 is wound into the resin material of the cylinder 10. As with FIG. 5, a charge is placed on the coil wire 216 and the conductive piston 210 and rod 214 are grounded. The coil windings vary in density across the length of the cylinder 10 to provide a change in capacitance.

Figure 7:
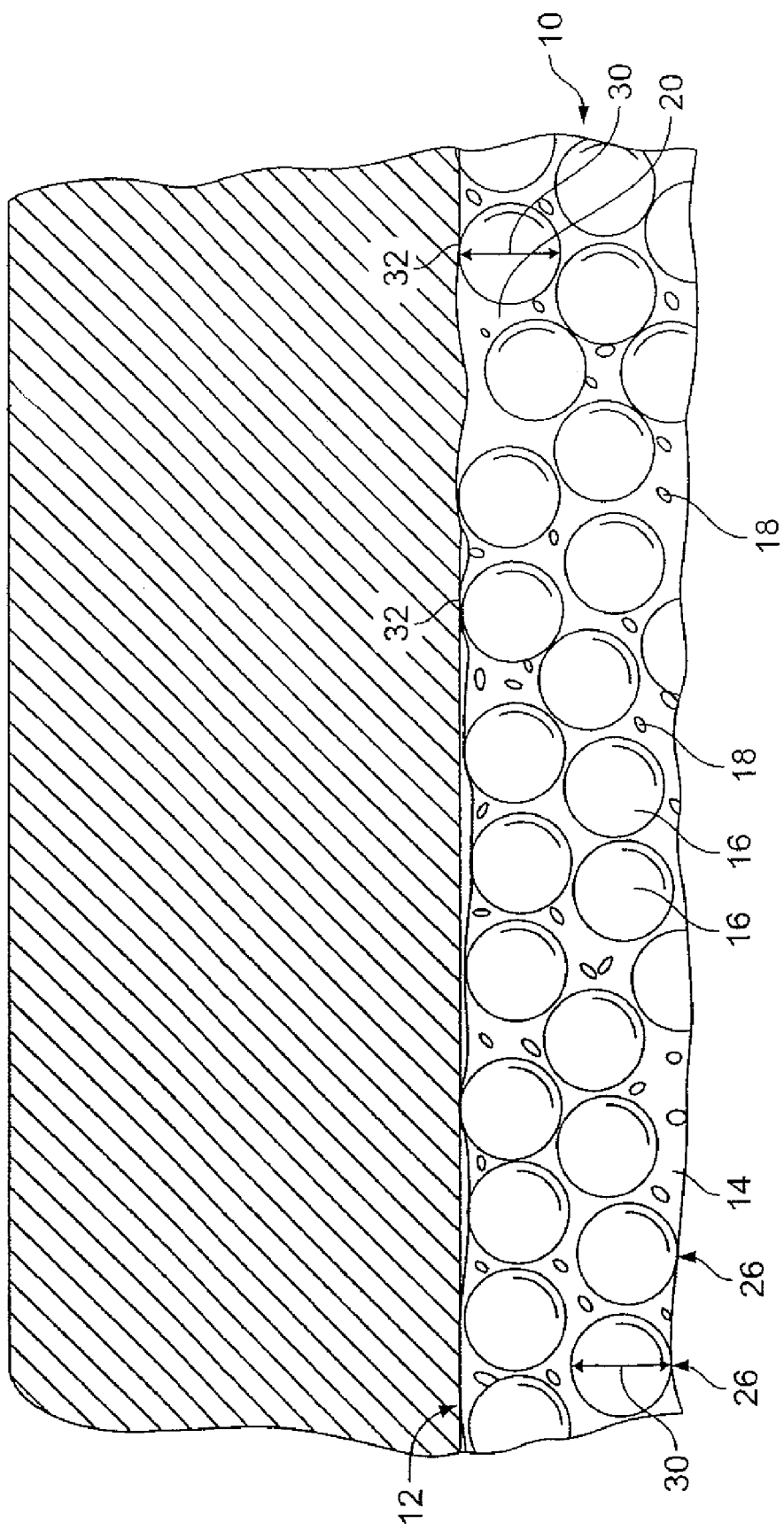
FIG. 7 is a partial, cross-sectional view of the hybrid bearing cylinder of the present invention.
Figure 8:
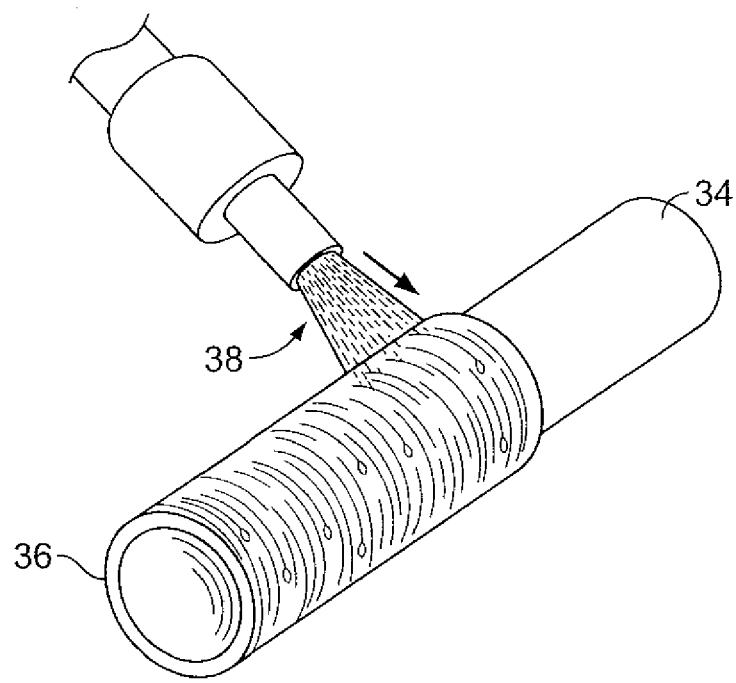
FIGS. 8-10 illustrate a series of steps used in producing the hybrid bearing cylinder of the present invention.

FIG. 7 shows the composite sleeve 10 having an inner surface 12. Composite sleeve 10 includes a resin matrix 14 with a continuous filament material 16 and, optionally, a plurality of particulate additives 18 embedded therein.

Resin matrix 14 is composed of a resin material having fumed silica (commonly sold under the trade name "Cab-O—Sil") therein. Advantageously, 2% to 10% (by weight) thereof is employed with about 8% fumed silica being preferred. While fumed silica is used it is contemplated that any material having similar thixotropic properties and tribological characteristics such as wear resistance and hardness could be used in place of fumed silica. An inner layer 20 of resin matrix 14 exists at inner surface 12, thereby greatly, due to the hardness imparted thereto by the fumed silica present therein. The resin material may be made to be either translucent or colored, as desired.

Continuous filament material 16 is helically embedded within resin matrix 14 to thereby add to the toughness (i.e., durability) of composite sleeve 10. Advantageously, filament windings 26 each have a round filament cross-section 30, thereby forming a series of rounded filament surfaces 32 at or near inner surface 12. Inner layer 20 of resin matrix 14 and the series of rounded filament surfaces 32 at or near inner surface 12 together actually define the totality of inner surface 12. In fact, the combination of the fumed silica in resin matrix 14 and rounded filament surfaces 32 permits the surface finish of inner surface 12 to be an arithmetic average roughness (Ra) of about 25 .mu.in or greater, whereas normal metallic or gel coated cylinders specify an Ra of less than 10 .mu.in.

Advantageously, continuous filament material 16 is a fiberglass material. Fiberglass offers advantages of good hardness, generally good durability, a round cross-section and translucency. Some possible choices for particulate additives 18 are polytetrafluoroethylene (PTFE), glass beads, fine ground silica, etc. or a combination thereof. PTFE, commonly sold under the trade mark "Teflon". Glass beads each offer a rounded surface and good hardness. Fine ground silica helps increase hardness.

Figure 9:
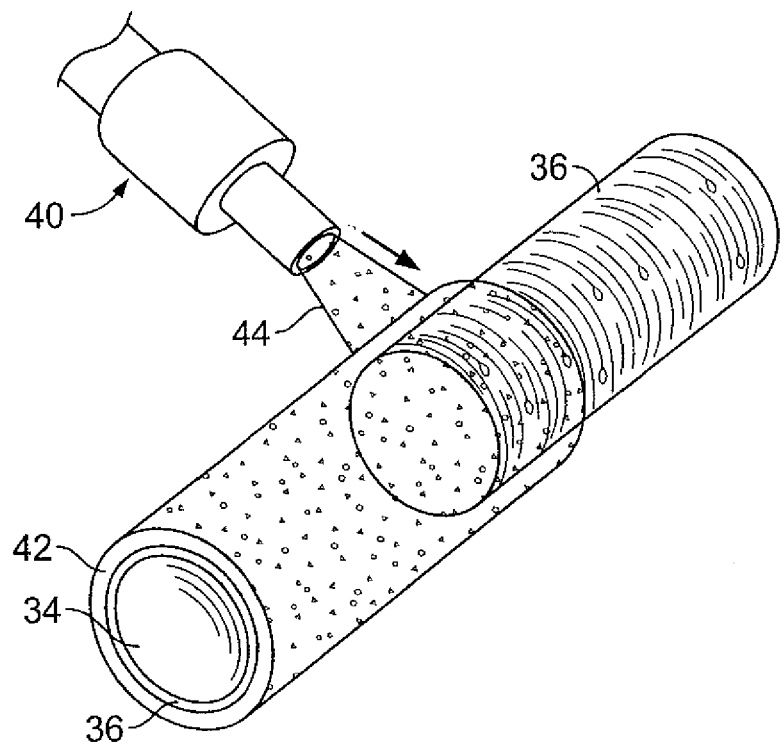
Figure 10:
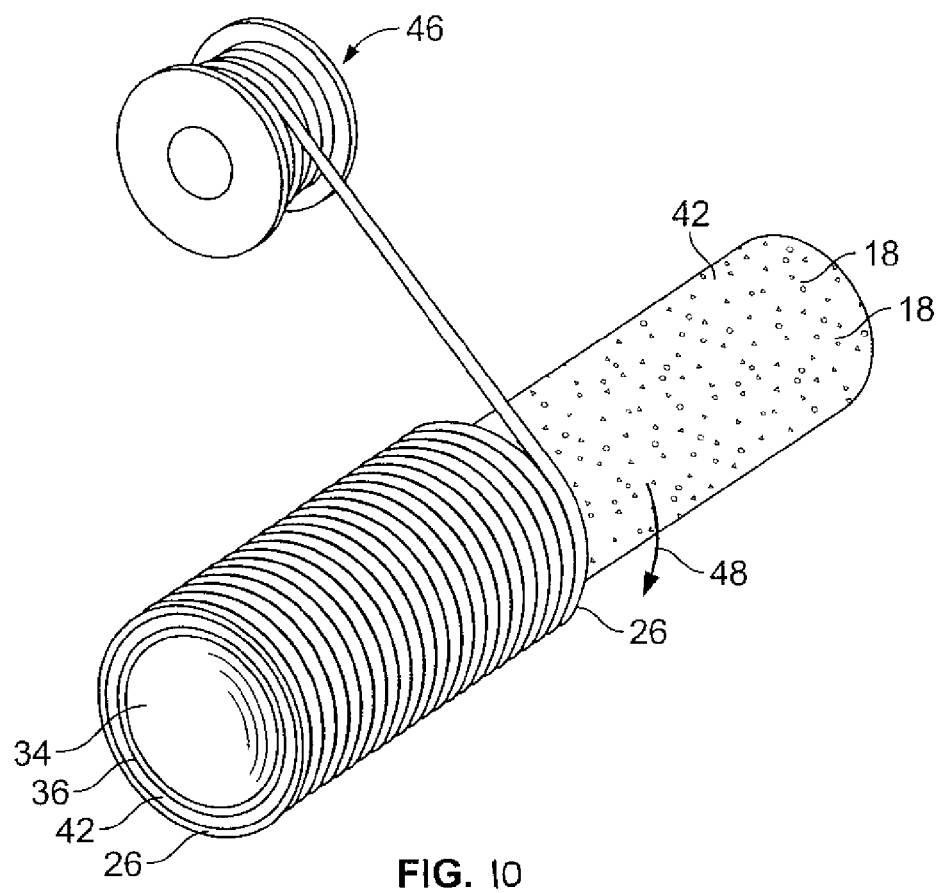
Figure 11:
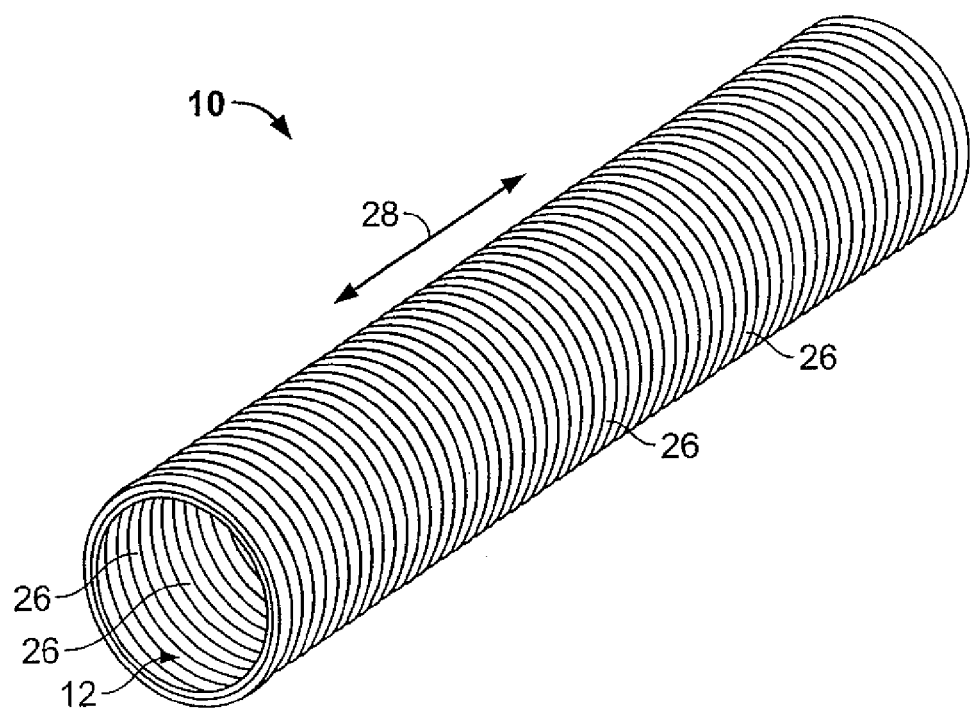
FIG. 11 is a perspective view of a completed hybrid bearing cylinder produced by employing the steps illustrated in FIGS. 8-10.
Figure 12:
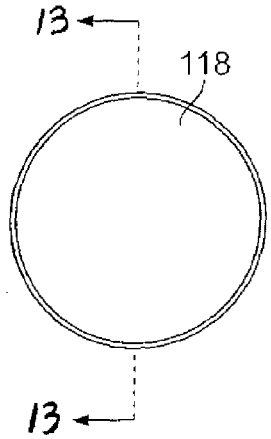
FIG. 12 is an end view of a bearing cylinder including a metal jacket.

FIGS. 7-11 together illustrate various steps in the production of composite sleeve 10, including a perspective view of the finished product FIG. 11. As set forth in FIG. 8, a highly polished mandrel 34 is provided to act as a mold for inner surface 12. Mandrel 34 advantageously has an arithmetic average roughness (Ra) of no more than about 10 μ inch. To help achieve the desired level of roughness and promote easy release thereof from the finished product, mandrel 34 is chrome plated.

The bore surface finish of the composite cylinder 10 is primarily a reflection of the mandrel surface finish. The normal bore surface finish of the composite cylinder 10 ranges from 10 Ra to 25 Ra micro-inches. The surface finish can even be higher and can simulate a microscopic "orange peel" surface profile resulting in less adhesion friction without adversely affecting the seal life as would be the case with bores of metallic cylinders.

To further aid in the release thereof from the finished product, mandrel 34, as shown in FIG. 7, is desirably initially coated with a release agent 36 supplied by a release agent applicator 38 (shown schematically). Additives can be provided within release agent 36 that will adhere to inner surface 12. PTFE can, for example, be used as such an additive. The coefficient of friction can further be reduced by the migration (transfer) of the mandrel release material from the mandrel to the composite bore surface. Above normal amounts of low friction additives in the mandrel release material such as PTFE particulates can further reduce the friction at the bore surface by the migration process.

In FIG. 9, a resin source 40 of an appropriate resin material 42 and an associated resin applicator 44 are provided. Resin applicator 44 is advantageously a trowel applicator, permitting the application of a controlled, even thickness of resin material 42 on mandrel 34. Resin material 42 is applied, desirably in a form of a paste, upon mandrel 34. Resin material 42 is troweled substantially evenly over entire mandrel 34, preferably to a thickness of about ⅛ inch.

As illustrated in FIG. 10, a filament source 46 of continuous filament material 16 is supplied and via which filament windings 26 that are formed substantially transversely of primary direction 26. (Mandrel 34 could be rotatably driven, as schematically shown via arrow 48, to promote the winding of continuous filament material 16 thereon.) Filament windings 26 displace and otherwise become embedded in resin material 42 during this step. After a suitable number of filament windings 26 have been formed along the entire length of mandrel 34 in resin material 42, continuous filament material 16 is cut (not shown) and, desirably, excess resin material 42 is wiped (not shown) from the outside of now-formed composite sleeve 10 before resin material 42 has an opportunity to cure. Once resin material 42 cures, mandrel 34 is then removed from composite sleeve 10 to reveal the finished product shown in FIG. 11.

Figure 13:
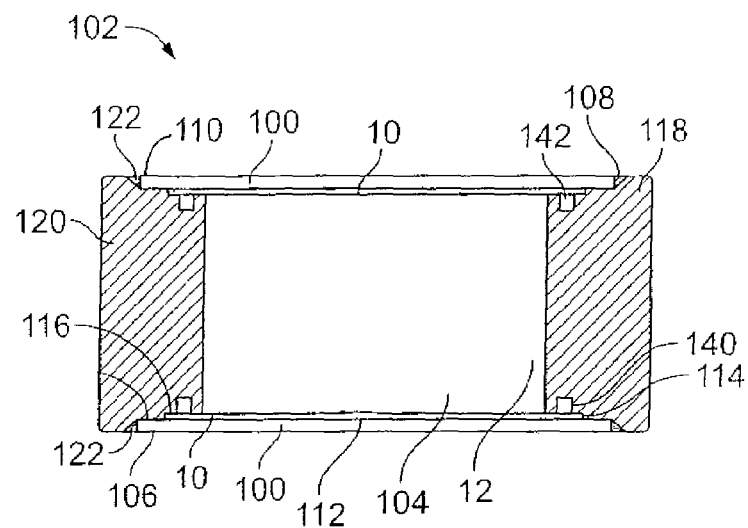
FIG. 13 is a cross section of the hybrid bearing cylinder taken along line 13-13 of FIG. 12 showing the composite bearing cylinder positioned within the metallic jacket and also showing the metallic jacket being secured to a pair of end caps by welding.
Figure 14:
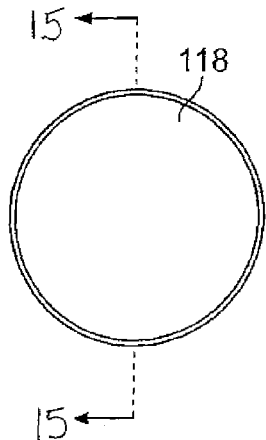
FIG. 14 is an end view of a bearing cylinder.

Composite sleeve 10 can be used in combination with a metallic jacket 100 to form hybrid bearing cylinder 102, as shown, for example, in FIG. 13. Metallic jacket 100 includes an inner surface 104, an outer surface 106 and first and second ends 108, 110. Composite sleeve 10 includes inner bearing surface 12 and machined outer surface 112. Outer surface 112 of composite sleeve 10 can be machined using a lathing process so that the outer diameter of composite sleeve 10 is the same as or slightly greater than the inner diameter of metallic jacket 100 to allow for the metallic jacket 100 to be positioned around and secured to composite sleeve 10 to form hybrid bearing cylinder 102.

The outside diameter of the composite sleeve 10 can be machined to give the desired fit between the bore of the outer metallic jacket 100 and the outer diameter of the inner composite sleeve 10. Normally there will be a slight interference fit for a press fit assembly. In situations where the composite sleeve 10 is bonded to the outer metallic jacket 100 the outside diameter of the composite sleeve would be slightly less than the metallic jacket inside diameter to allow the proper bond joint thickness.

Figure 15:
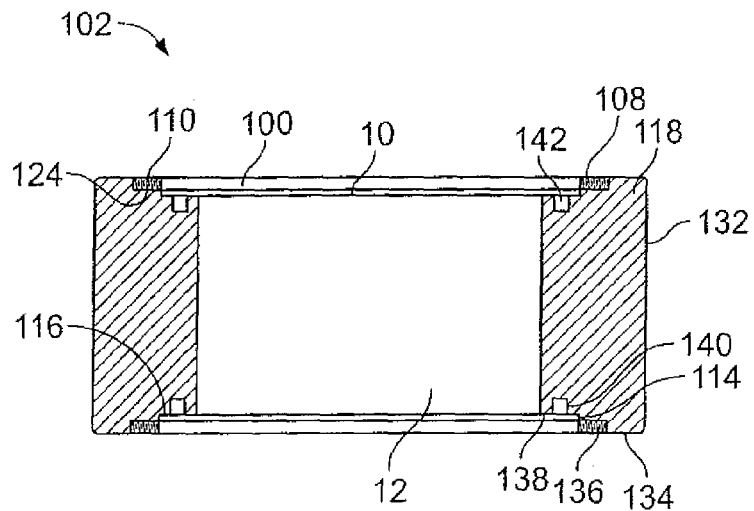
FIG. 15 is a cross section of the hybrid bearing cylinder taken along line 15-15 of FIG. 14 showing the composite bearing cylinder positioned within the metallic jacket and also showing the metallic jacket being secured to a pair of end caps by threads positioned at the ends of the metallic jacket.

Composite sleeve 10 includes first and second ends 114, 116, as shown, for example, in FIG. 13. The overall length of composite sleeve 10 is shorter than metallic jacket 100 such that first and second ends 114, 116 of composite sleeve 10 are set in from first and second ends 108, 110 of metallic jacket 100. This arrangement allows metallic jacket 100 to be either be secured to end caps 118, 120 by use of welds 122, as shown in FIG. 13 or by threads 124, as shown in FIG. 15 for example.

Use of composite sleeve 10 in combination with metallic jacket 100 provides lower seal wear and friction characteristics of composite sleeve 10 when used with a metallic cylinder 100. Metallic cylinder 100 can be made from steel, aluminum or stainless steel. Hybrid bearing cylinder 102 reduces the cost of surface preparation of the metallic cylinders used for fluid power, pneumatic and hydraulic cylinder applications because inner bearing surface 12 is already smooth due to the manufacturing process of the composite sleeve 10.

Use of composite sleeve 10 in combination with metallic jacket 100 provides corrosion resistance to the bore surface allowing other non-compressible fluids, such as water, to be used other than conventional hydraulic fluids, and the design results in an overall weight reduction in the cylinder. The hybrid bearing cylinder 102 incorporates the strength and stiffness of metal cylinders and incorporates the bearing surface benefits of the composite sleeve material 10. Use of hybrid bearing cylinder 102 reduces the overall geometric size of the cylinder as compared with an all composite cylinder.

With the additional strength of hybrid bearing cylinder 102 over metal cylinders the pressure rating of non-repairable metallic cylinders used for low pressure hydraulic applications can be increased for 500 psig to 1500 psig applications.

End caps 118, 120 are designed to be secured to hybrid bearing cylinder 102 to provide an end seal, as shown, for example, in FIGS. 13 and 15. Depending upon the application, end caps 118, 120 may or may not include a central aperture 126 to permit the passage of a rod 128 used in combination with a piston 130, as shown, for example, in FIG. 18. In the provided examples of the disclosure, end caps 118, 120 include an end wall 132 and an annular side wall 134.

Annular side wall 134 of end caps 118, 120 includes a first annular recess 136 positioned to lie near first and second ends 108, 110 of metallic jacket 100, as shown, for example, in FIG. 13. Metallic jacket 100 can either be welded to side wall 134 of end caps 118, 120 or first annular recess 136 can include threads 124 that engage corresponding threads formed on the inner surface 104 of metallic jacket 100, as shown, for example, in FIG. 15.

End caps 118, 120 also include a second annular recess 138 that is positioned to lie near first and second ends 114, 116 of composite sleeve 10, as shown, for example, in FIG. 13. Second annular recess 138 includes an annular groove 140 that is adapted to accept an o-ring seal 142 to seal against the inner bearing surface 12 of composite sleeve 10.

Figure 16:
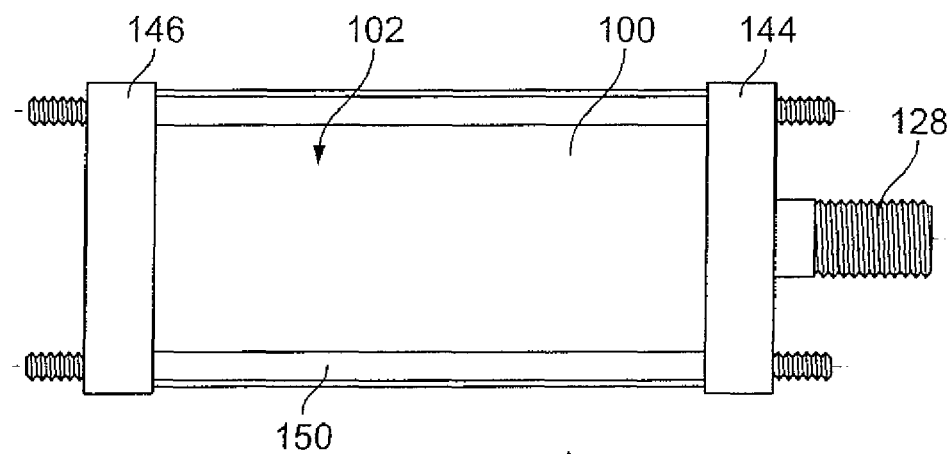
FIG. 16 is a side elevational view of a hybrid bearing cylinder secured to a pair of end caps by a series of threaded rods that extend from end cap to end cap.
Figure 17:
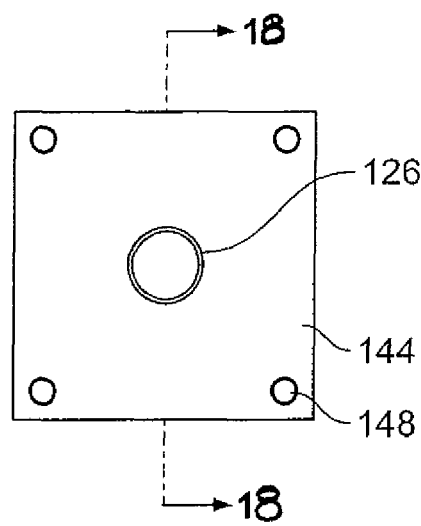
FIG. 17 is an end view of the hybrid bearing cylinder of FIG. 16.
Figure 18:
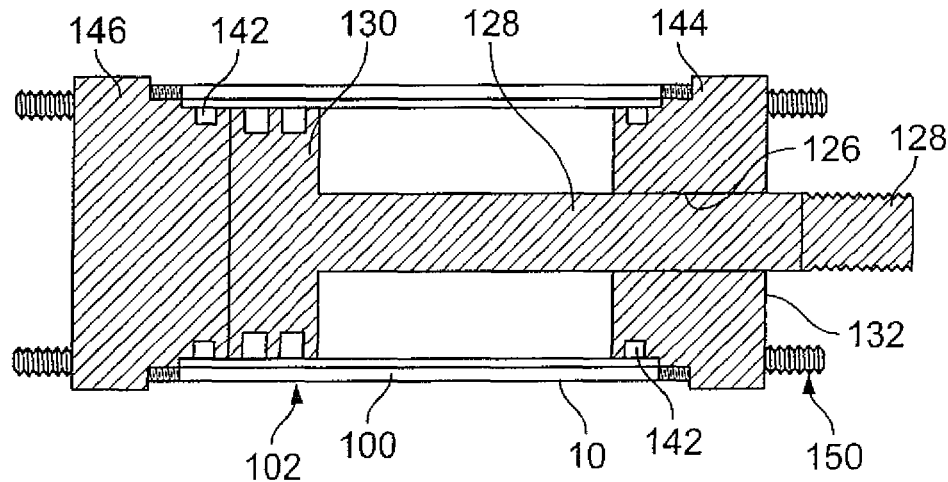
FIG. 18 is a cross section of the hybrid bearing cylinder taken along line 18-18 of FIG. 17 showing the composite bearing cylinder positioned within the metallic jacket and also showing the metallic jacket being secured to a pair of end caps by elongated threaded rods that extend from end cap to end cap.

End caps 144, 146 of hybrid bearing cylinder 102 of FIGS. 16-18 include a series of apertures 148 adapted to accept tie rods 150 that extend from end cap 144 to end cap 146 to compress end caps 144, 146 against hybrid bearing cylinder 102. Use of tie rods 150 replaces the use of welds or threads to secure end caps 144, 146 to hybrid bearing cylinder 102. Use of welds or threads eliminate the need to use tie rods. Swaging, while not illustrated in the figures, can also be used to secure end caps 118, 120 to hybrid bearing cylinder 102.

Metallic jacket 100 can be assembled with composite sleeve 10 by press fitting the two components together. Another method for assembling metallic jacket 100 to composite sleeve 10 is by thermally expanding the metallic jacket 100 prior to inserting composite sleeve 10. Alternatively, metallic jacket 100 can be bonded to composite sleeve 10 by use of an adhesive or can be metal formed by use of swaging, roll forming, or drawing processes. Use of metallic jacket 100 with composite sleeve 10 provides a sealing barrier for the composite sleeve 10 for applications that require the containment of gasses such as helium.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composite cylinder having position sensing capabilities comprising
   a dielectric composite cylindrical wall having a continuous inner bearing surface and an outer surface,
   the inner bearing surface defining a primary bearing direction along an axis of the cylinder, a resin matrix composed of a resin, the resin at least partially lying at the inner bearing surface, a conductive material embedded within the resin matrix, a resistive material positioned inwardly of the inner bearing surface, and a filament material embedded within the resin matrix.

2. The composite cylinder of claim 1 wherein the conductive material is in the form of conductive fibers that are filament wound during manufacture of the composite cylinder.

3. The composite cylinder of claim 2, wherein the conductive fibers include carbon fiber.

4. The composite cylinder of claim 3, wherein the conductive fibers are positioned between the inner bearing surface and the outer surface of the dielectric composite cylindrical wall.

5. The composite cylinder of claim 4, wherein the resistive material is positioned between the conductive fibers and the outer surface of the composite cylindrical wall.

6. The composite cylinder of claim 5, wherein the resistive material is formed to include a polymeric gel coat having a conductive filler.

7. The composite cylinder of claim 6, wherein the conductive filler is in the form of carbon black to control the amount of resistivity.

8. The composite cylinder of claim 1, wherein the resistive material includes a conductive prepreg and a dielectric reinforcing material.

9. A composite cylinder having position sensing capabilities to determine the position of a piston within the composite cylinder by use of an electric sensor, the composite cylinder comprising a dielectric composite cylindrical wall having a continuous inner bearing surface and an outer surface, the piston adapted to slide with respect to the inner bearing surface of the cylinder wall, the inner bearing surface defining a primary bearing direction along an axis of the cylinder, a resin matrix composed of a resin, the resin at least partially lying at the inner bearing surface, a conductive material embedded within the resin matrix, a resistive material positioned inwardly of the inner bearing surface, and a filament material embedded within the resin matrix, wherein the electronic sensor can determine the position of the piston within the composite cylinder.

10. The composite cylinder of claim 9, wherein the conductive fibers include carbon fiber.

11. The composite cylinder of claim 10, wherein the conductive fibers are positioned between the inner bearing surface and the outer surface of the dielectric composite cylindrical wall.

12. The composite cylinder of claim 11, wherein the resistive material is positioned between the conductive fibers and the outer surface of the composite cylindrical wall.

13. The composite cylinder of claim 12, wherein the resistive material is formed to include a polymeric gel coat having a conductive filler.

14. The composite cylinder of claim 13, wherein the conductive filler is in the form of carbon black.

15. The composite cylinder of claim 9, wherein the resistive material includes a conductive prepreg and a dielectric reinforcing material.

16. The composite cylinder of claim 9, wherein the conductive material is in the form of a metallic foil embedded within the resin matrix during the fabrication of the composite cylinder.

17. The composite cylinder of claim 9, wherein the conductive material is in the form of a metallic wire that is wound into the resin matrix during the fabrication of the composite cylinder.

18. The hybrid bearing cylinder of claim 9, wherein the resin matrix further contains a plurality of particulate additives, said particulate additives being at least one of polytetrafluoroethylene, glass beads and ground silica.

19. The hybrid bearing cylinder of claim 18, wherein the resin matrix comprises about 2% to 8% by weight of fumed silica.

\* \* \* \* \*